United States Patent

Datta

[11] Patent Number: 5,901,826
[45] Date of Patent: May 11, 1999

[54] CLUTCH PRESSURE PLATE WITH BACKING PLATE

[75] Inventor: Jayanta Datta, Forest Park, Ill.

[73] Assignee: Borg-Warner Automotive, Inc., Sterling Heights, Mich.

[21] Appl. No.: 08/746,498

[22] Filed: Nov. 12, 1996

[51] Int. Cl.[6] .................................................. F16D 13/00
[52] U.S. Cl. ................................ 192/70.14; 192/107 M; 74/665 GA
[58] Field of Search ......................... 192/70.14, 107 M, 192/107 R, 113.21; 74/665 GA; 188/218, 251 M, 251 A

[56] References Cited

U.S. PATENT DOCUMENTS

| | | |
|---|---|---|
| 2,690,248 | 9/1954 | McDowall . |
| 3,191,734 | 6/1965 | Batchelor et al. ............. 192/107 M X |
| 3,371,756 | 3/1968 | Spitz ................................ 192/107 M X |
| 3,472,348 | 10/1969 | Hilpert ............................ 192/107 R X |
| 3,491,865 | 1/1970 | Stockton ........................ 192/ 107 R X |
| 3,584,718 | 6/1971 | Schiefer et al. ............... 192/107 M X |
| 3,635,320 | 1/1972 | Capanna ............................ 192/107 M |
| 3,850,277 | 11/1974 | Adachi . |
| 4,049,090 | 9/1977 | Buell ............................... 192/107 M X |
| 4,180,622 | 12/1979 | Burkhard et al. .............. 192/107 M X |
| 4,667,796 | 5/1987 | Uchibaba . |
| 4,762,021 | 8/1988 | Teraoka ............................... 74/665 GA |
| 4,830,164 | 5/1989 | Hays . |
| 5,048,654 | 9/1991 | Yesnik . |
| 5,052,536 | 10/1991 | Maeda . |
| 5,056,631 | 10/1991 | MacDonald ..................... 192/107 R X |
| 5,117,949 | 6/1992 | Buckley et al. ................ 192/107 R X |
| 5,154,683 | 10/1992 | Phelps ............................ 192/107 M X |
| 5,526,914 | 6/1996 | Dwivedi et al. ................... 192/107 M |

FOREIGN PATENT DOCUMENTS 58160850   3/1985   Japan .

OTHER PUBLICATIONS

Basketball Products International, Inc., 95–96 Product Catalog pp. 38–40, Jun. 1995.

*Primary Examiner*—Khoi Q. Ta
*Assistant Examiner*—Saul J. Rodriguez
*Attorney, Agent, or Firm*—John A. Artz, Esq.; Greg Dziegielewski, Esq.

[57] ABSTRACT

A friction clutch having a friction plate and a pressure plate located within the friction clutch housing. The friction clutch has a backing plate that is positioned between the friction plate and the pressure plate with the backing plate being made from a harder material, such as steel, than the pressure plate which is made from a softer material, such as aluminum.

7 Claims, 1 Drawing Sheet

CLUTCH PRESSURE PLATE WITH BACKING PLATE

TECHNICAL FIELD

The present invention relates to a pressure plate for a clutch and more specifically to a clutch assembly having a die cast aluminum pressure plate for a friction clutch.

BACKGROUND OF THE PRESENT INVENTION

Friction type clutches are well known in the art. Friction type clutches generally comprise two discs. The first disc is more substantial and is usually the engine flywheel; the other disk is usually lighter and commonly referred to as the pressure plate. The flywheel is bolted to a flange on the end of the crankshaft, while the pressure plate slides axially on the output shaft. A spring mechanism is used to press the pressure plate against the flywheel.

In these general friction type clutches, engine torque is transmitted from the engine flywheel to the pressure plate by the friction between the two abutting forces. Because of this large amount of torque, the surface of the discs need to be formulated from a material having a high coefficient of friction, coupled with good wearing properties. The materials that are used to create these products often are too heavy and too expensive.

In other applications, clutch systems are used as part of a transfer case in a four-wheel drive vehicle. The transfer case transmits power (torque) to the front wheels of the vehicle from the rear wheels. The clutch is used to transmit this power from the rear input shaft to the front output shaft. The pressure plate applies the force to the clutch so that it engages and power is transmitted.

Methods and apparatus have been used to try to improve transfer case clutch systems and basic clutch systems in general. Some of these prior systems have tried to extend the life of the clutch disks, but they often proved to be too heavy and/or expensive.

SUMMARY OF THE INVENTION

It is an object of the present invention to provide a pressure plate for a friction clutch that is lighter and less expensive than prior friction clutches. Another object of the present invention is to provide a friction clutch that is more durable and operates longer than prior friction clutches and is less expensive to manufacture.

Still another object is to provide an improved clutch assembly for a transfer case for a four-wheel drive vehicle. A still further object of the present invention is to provide a transfer case clutch mechanism which has increased transmitted torque.

According to the present invention, there is provided a clutch mechanism with a clutch housing and at least one friction plate and pressure plate located therein. The clutch housing also includes a backing plate that is positioned between the friction plate and the pressure plate. The backing plate of the present invention is made from a material that is harder than the material from which the pressure plate is made.

In accordance with the preferred embodiment of the invention, the pressure plate is made from an aluminum material and the backing plate is made from a steel material. The pressure plate also has one or more reinforcing ribs on it.

Additional features and advantages of the present invention will become apparent to one of skill in the art upon consideration of the following detailed description of the present invention.

DESCRIPTION OF THE PREFERRED EMBODIMENTS

Figure 1:
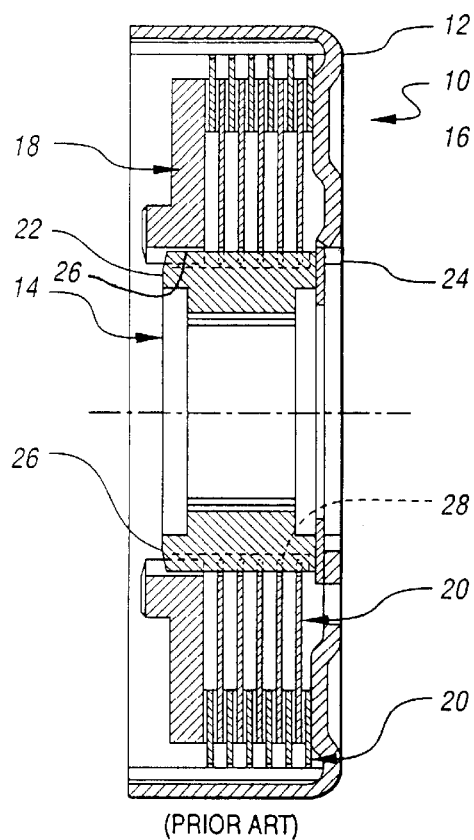
FIG. 1 is a cross-sectional view of a prior art clutch assembly.

FIG. 1 illustrates a prior art friction clutch referred to generally by the reference number 10. The friction clutch 10 includes a clutch housing 12, which contains a clutch hub 14, a thrust washer 16, a pressure plate 18, and a plurality of friction plates 20.

The clutch 10 is used to engagingly connect the adjacent ends of two coaxial shafts, such as an input shaft (not shown) in communication with the left side 22 of the pressure plate 18 and an output shaft (not shown) in communication with the right side 24 of the clutch hub 14 and the friction plates 20.

In operation, the input shaft (not shown) causes the pressure plate 18 to rotate and the output shaft can be moved laterally to put pressure on the pressure plate 18. The pressure plate 18 is attached to the hub 14 by splines 26 or the like and thus the hub 14 is also caused to rotate. The friction plates 20 are also attached to the clutch hub 14 by splines 28 or the like and they are also caused to rotate. The friction plates 20 allow slipping between themselves and the pressure plate 18 until they are both rotating at the same speed. The friction plates 20 are in communication with the output shaft (not shown) and therefore drive the output shaft at the same speed as they are rotating.

Figure 2:
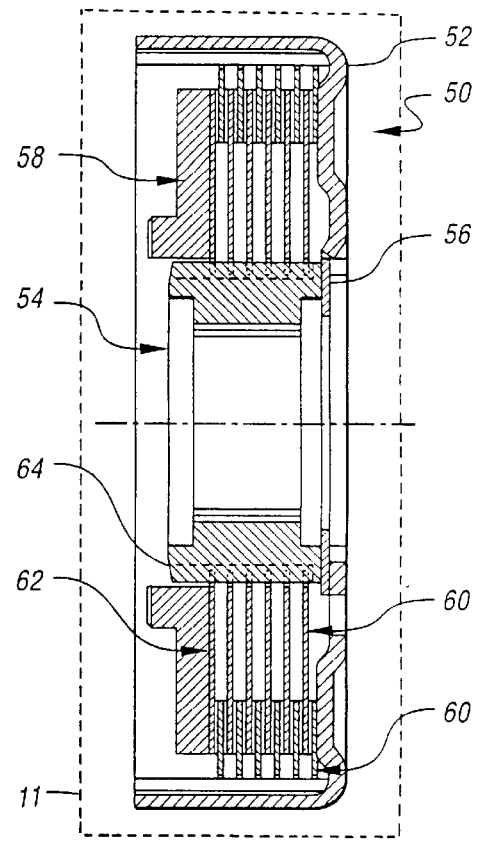
FIG. 2 is a cross-sectional view of a clutch assembly in accordance with a preferred embodiment of the present invention.

FIG. 2 illustrates a preferred embodiment of the present invention. The clutch assembly of the preferred embodiment is generally referred to by reference number 50. The clutch assembly 50 includes a clutch housing 52, which houses a clutch hub 54, a thrust washer 56, a pressure plate 58, a plurality of friction plates 60, and a backing core plate 62. Although the drawings illustrate 11 friction plates, it should be understood that more or less friction plates may be utilized.

The pressure plate 58 of the preferred embodiment is manufactured from a die cast aluminum alloy, preferably 380 alloy. However, other aluminum alloys may also be used as well as other forming or machining processes. The aluminum pressure plate 58 of the present invention is approximately ⅓ the weight of conventional pressure plates that are manufactured from powdered metal. Additionally, the aluminum part is far less expensive to manufacture than the prior powdered metal pressure plates.

Another advantage of using aluminum is its non-magnetic properties. Since it is non-magnetic, it does not absorb any of the magnetic flux from the applying mechanism. As a result, greater force can be applied on the clutch which increases the transmitted torque.

Aluminum is known for its softness and thus was not thought to be applicable for use in these applications because of the high friction forces and torque involved. It was previously thought that the aluminum would deform and thus would need to be replaced if it was subjected to clutch types of loads. However, a finite element analysis done on the aluminum pressure plate formed in accordance with the preferred embodiment demonstrated that the maximum VonMises stress was below the fatigue strength of the material indicating that the part would not fail under repeated loading.

A pressure plate made in accordance with the present invention was also tested on an MTS stroker machine with repeated loading of 3200 lbs. Two samples were tested and no visible failure occurred in either sample within a million cycles. The part was checked every 300,000 cycles. The test was continued on one of the samples until failure was observed. Cracks were first observed after 50.1 million cycles.

In conventional friction clutch transfer cases, the pressure plate 58 has force exerted on it by a ball cam mechanism (not shown). The pressure plate 58 in turn exerts this force to the multiple friction plates 60 in the clutch.

The friction plates 60 of the present invention help to transfer torque from the input shaft (not shown) to the clutch housing 52 and then to the output shaft (not shown) through the use of a chain drive. The torque imparted to this output shaft is proportional to the force exerted by the pressure plate 58.

In order to prevent friction wear to the aluminum part under constant slip conditions, a backing core plate 62 is preferably positioned between the pressure plate 58 and the first friction plate 60. An alternative arrangement can also be made with the friction plates turned in the other direction with the friction material on the side away from the pressure plate. As a result, the aluminum pressure plate rubs only with the steel side of the friction plate preventing any wear.

The core backing plate 62 is preferably manufactured from steel or any other suitable material that is harder than the pressure plate 58. The core backing plate 62 is attached to the clutch hub 54 by splines 64 or the like. Torque tests with the core backing plate 62 inserted between the pressure plate 58 and the friction plate 60 have shown zero wear on the aluminum pressure plate. The core backing plate 62 adds additional strength to the friction plate 58 and thus the clutch assembly 50. Moreover, as the torque from the hub is imparted directly to the core backing plate 62, the spline 26 for the pressure plate 58 is no longer needed.

Figure 3:
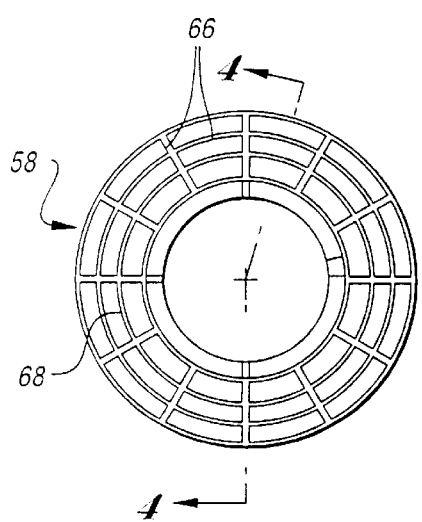
FIG. 3 is a front view of a pressure plate in accordance with another preferred embodiment of the present invention.
Figure 4:
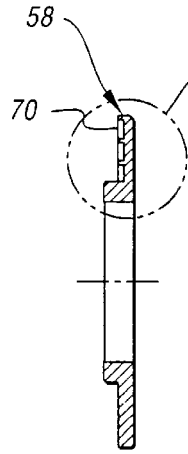
FIG. 4 is a cross-sectional view of the pressure plate of along the lines 4—4 in FIG. 3.
Figure 5:
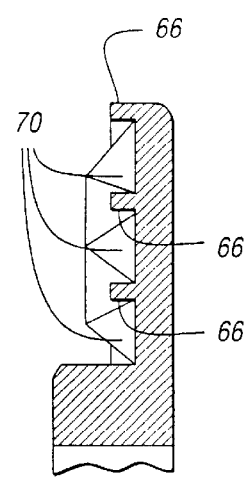
FIG. 5 is an enlarged illustration of section A in FIG. 4.

As shown in FIGS. 3 through 5, the pressure plate 58 preferably has a plurality of ribs 66 formed on its outer surface 68. The ribs 66 are arranged both perpendicular to the circumference of the plate and also circular with different radiuses. The intersection of the ribs 66 form a plurality of pockets 70 formed in the surface of the plate. The ribs help to strengthen the pressure plate 58. By use of the aluminum pressure plate 58, the clutch assembly will be lighter and the cost of the clutch assembly will be lower. The lighter weight could also contribute to better vehicle fuel efficiency.

While only one preferred embodiment of the invention has been described hereinabove, those of ordinary skill in the art will recognize that this embodiment may be modified and altered without departing from the central spirit and scope of the invention. Thus, the embodiment described hereinabove is to be considered in all respects as illustrative and not restrictive, the scope of the invention being indicated by the appended claims, rather than by the foregoing descriptions, and all changes which come within the meaning and range of equivalency of the claims are intended to be embraced herein.

We claim:

1. A clutch mechanism comprising:

a housing;

at least one friction plate positioned in said housing;

a pressure plate in communication with said at least one friction plate in said housing and comprised of an aluminum alloy; and a backing plate positioned between said friction plate and said pressure plate, said backing plate made of a steel material which is harder than said aluminum alloy.

2. The clutch mechanism of claim 1 further comprising at least one strengthening rib member on said pressure plate.

3. The clutch mechanism of claim 1, wherein said clutch is part of a transfer case.

4. A method of assembling a friction clutch, comprising the steps of:

providing a clutch housing;

positioning a clutch hub within said clutch housing;

providing at least one friction plate in rotational communication with said clutch hub;

providing a pressure plate made of an aluminum alloy and in rotational communication with one of said at least one friction plate; and positioning a steel backing plate between said pressure plate and said at least one friction plate.

5. The method of claim 4, wherein said pressure plate has a plurality of ribs formed in one of its faces to improve the strength of said plate.

6. A friction clutch assembly for use in a transfer case comprising:

a clutch housing;

a clutch hub positioned within said clutch housing;

an output shaft in communication with said clutch hub;

a plurality of friction plates in communication with said clutch hub;

an aluminum pressure plate moveable to and from an engagement position with said plurality of friction plates to provide torque thereto; and a steel plate position between said aluminum pressure plate and said plurality of friction plates.

7. The assembly of claim 6, wherein said plurality of plates are in communication with said clutch hub via a plurality of splines.

* * * * *